United States Patent [19]

Hillenmayer

[11] Patent Number: 5,719,936
[45] Date of Patent: Feb. 17, 1998

[54] COMMUNICATION DEVICE FOR MOBILE OPERATION HAVING A TELEPHONE AND NOTEBOOK WITH DISPLAY

[75] Inventor: Stefan Hillenmayer, Munich, Germany

[73] Assignee: Siemens Aktiengesellschaft, Munich, Germany

[21] Appl. No.: 609,963

[22] Filed: Feb. 29, 1996

[30] Foreign Application Priority Data

Mar. 7, 1995 [DE] Germany ............... 195 08 003.3
Jan. 31, 1996 [DE] Germany ............... 196 03 483.3

[51] Int. Cl.⁶ ........................................... H04M 1/00
[52] U.S. Cl. ............... 379/447; 379/428; 379/440; 379/433; 455/403; 455/575
[58] Field of Search ................... 379/428, 440, 379/433, 447, 426, 56, 58, 110; 455/90, 74, 95, 128, 403; 364/708.1, 705.5, 705.03, 705.01

[56] References Cited

U.S. PATENT DOCUMENTS

| | | | |
|---|---|---|---|
| 5,020,090 | 5/1991 | Morris | 379/58 |
| 5,375,076 | 12/1994 | Goodrich et al. | 364/708.1 |
| 5,491,507 | 2/1996 | Umezawa et al. | 379/433 |
| 5,537,343 | 7/1996 | Kikinis et al. | 36/708.1 |
| 5,584,054 | 12/1996 | Tyneski et al. | 379/58 |

OTHER PUBLICATIONS

NN, "Gehilfe für die Jackentasch" in *Funkschau* Dec. 1993, pp. 8–22.
Sheng, S., et al, "A Portable Multimedia Terminal" in *IEEE Comm.*, May, Dec. 1992, pp. 64–75.
NN, "Persönliche Digitale Assistenten" in *Funkshau* Jan. 1994, pp. 8–15.

Primary Examiner—William Cumming
Assistant Examiner—Keith Ferguson
Attorney, Agent, or Firm—Hill, Steadman & Simpson

[57] ABSTRACT

A communication device for mobile operation is equipped with a telephone as well as with a notebook with a display. Prior art devices have a housing in "pocket format" and a practically unrestricted mobility only with a greatly restricted range of functions, for example the lack of an integrated telephone part. Further, the built-in computers are usually only designed as "notepads" without a keyboard. The communication device (1) for mobile operation has a telephone and a notebook with a touch-sensitive display (3) that is accommodated in a pocket-format device housing (3) composed of two sub-sections (9,10) connected to one another at a swivelling axis (8). The telephone and the display (3) are accommodated in one sub-section (10), whereas the other sub-section (9) holds an alphanumerical keyboard (14) accessible to the user. The telephone, at least a part (2) thereof that serves as a handset and that is movable, can be wirelessly separated from the device when the communication device (1)is in its unfolded condition. The simultaneous operation of the telephone and the notebook is possible with the display also serving as the telephone keyboard.

20 Claims, 5 Drawing Sheets

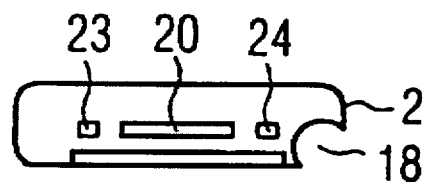
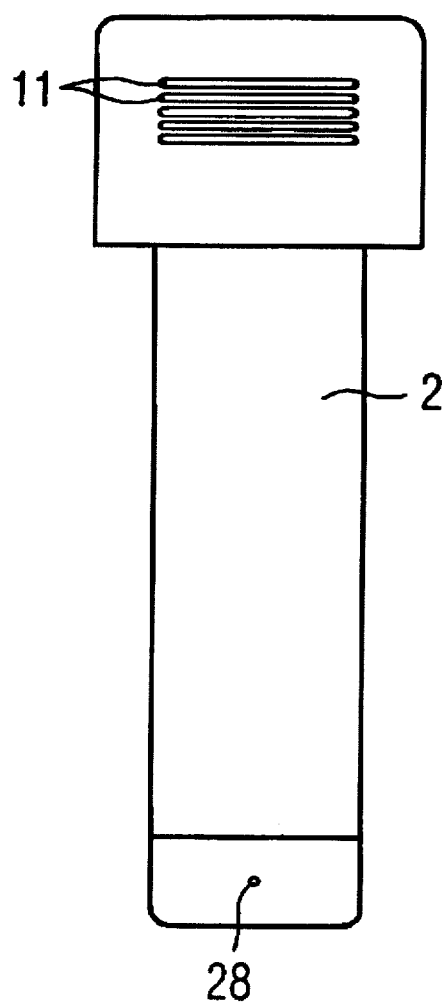

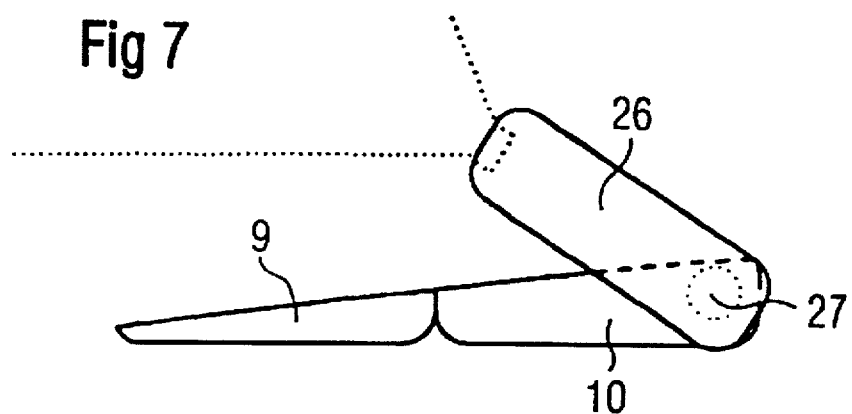
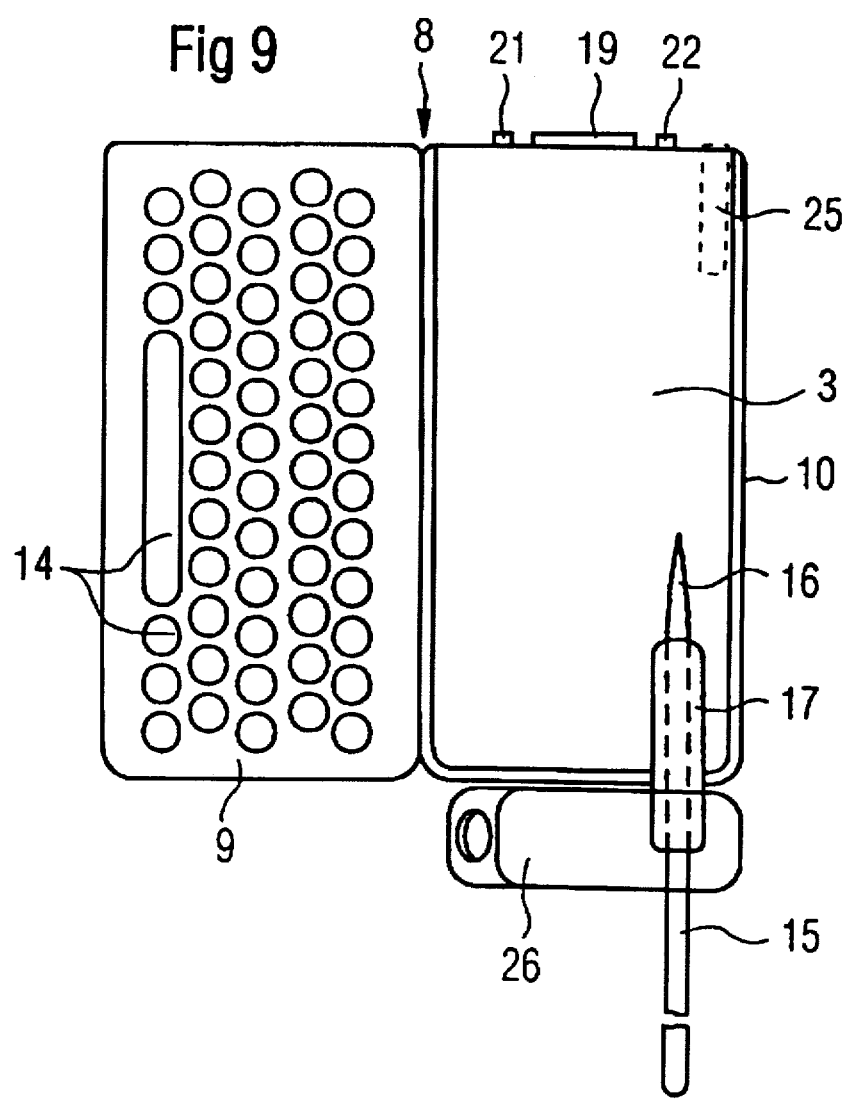

COMMUNICATION DEVICE FOR MOBILE OPERATION HAVING A TELEPHONE AND NOTEBOOK WITH DISPLAY

BACKGROUND OF THE INVENTION

The invention is directed to a communication device for mobile operation, the device being equipped with a telephone as well as with a notebook having a display.

Such devices are designed as terminal equipment for mobile communication and are usually referred to under the name of Personal Digital Assistant (PDA) in the literature. In addition to their mobility, they are distinguished by the integration in a single apparatus of a number of devices and functions previously realized in separate units. Due to the on-going miniaturization in microelectronics, PDA devices are already available that, in addition to having a mobile telephone and a notepad or, respectively, notebook as integrated units, also have automatic handwriting recognition on a touch-sensitive display. Also PDA devices have terminal functions such as, for example, the sending and receiving of electronic data as telefax, electronic mail (E-mail) via a built-in modem (see, for example, NN, "Gehilfe für die Jackentasche" in *Funkschau* December 1993, pp. 8–22; Sheng, S., et al., "A Portable Multimedia Terminal" in *IEEE Comm.* May, December 1992, pp.64–75; NN, "Persönliche Digitale Assistenten" in *Funkschau January* 1994, pp.8–15).

Previously known and distributed PDA devices, however, only conditionally meet the claim of being "a coat-pocket assistant". Although portable devices that can be operated independently of a line connection are always involved, they have a convenient housing in "pocket format". However, such devices have practically unrestricted mobility, only with a greatly restricted range of functions, for example the lack of an integrated telephone part. Further, the built-in computers are usually only designed as "notepads" without a keyboard instead of as a full-feature "notebook" that can be used as a personal computer and terminal.

SUMMARY OF THE INVENTION

It is an object of the present invention to provide a communication device having an integrated telephone and notebook with improved mobile usability.

This object is achieved by a communication device for mobile operation that has a telephone and a notebook with a display. The device housing has a pocket format and is composed of two sub-sections connected to one another at a swivelling axis and can be folded open. One sub-section contains a receptacle for the telephone part and the display. The other sub-section has a keyboard accessible to the user. The display is a touch-sensitive display means via which inputs for the notebook or, respectively, the telephone can ensue dependent on operating conditions. The telephone, or at least a part thereof, that serves as a handset and is movable relative to the associated sub-section, can be wirelessly separated from the device when the communication device is in its unfolded condition, whereby the simultaneous operation of telephone and notebook is possible. For use only as a telephone, the movable part of the telephone is mechanically connected to the display in the folded condition of the device and, together therewith, can be nearly entirely withdrawn from the receptacle, whereby the touch-sensitive display is operated as a telephone keyboard.

The integration of the device functions in a pocket-sized housing is thereby promoted by the space-saving and weight-saving, two-fold employment of the display as a display and as an input means for the notebook and the telephone. Comfortable handling of the device when only used in telephone mode is assured by the extractability of the mobile telephone part. It is also advantageous that, with the telephone part separated from the opened device, simultaneous operation of telephone and notebook is possible. When the communication device is folded up, the keyboard and the display are located inside the housing and are thus protected against mechanical damage, for example when being carried in the proverbial coat pocket.

Advantageous embodiments and developments of the present invention are as follows.

In a first embodiment, the telephone is fashioned as a mobile telephone integrated in the communication device, whereby the movable or, respectively, removable part of the telephone is operated as a cordlessly operable handset with respect to the apparatus.

The movable or, respectively, removable part of the telephone can be designed as a complete mobile telephone that is functionally independent of the rest of the device.

In a third embodiment, the telephone as a whole is a cordless telephone with an external base station that does not belong to the device itself. This form is expedient when the device is to be used only in a spatially limited area, for example in an office building or the grounds of a company. Unnecessary high telephone charges of a mobile telephone can thereby be avoided in this case.

In one development of the communication device, the notebook has a modem for the transmission of data via the telephone. As already mentioned, the wireless sending and receiving of electronic data, for example as telefax or electronic mail (E-mail), thus becomes possible.

According to one development of the communication device, sound passages that assure the guidance of sound to the transmitter are inset in the movable telephone part both in the introduced as well as in the withdrawn condition of the movable telephone part with the device folded up are respectively provided in the housing part that protects the keyboard.

According to an alternative development of the present invention, the sound passages can also be foregone when an additional transmitter that can be activated externally to the outside of the folded up device and that assumes the microphone function of the transducer present in the movable telephone part in this position of use, is provided in the housing part that protects the keyboard. When the movable telephone part is then withdrawn, a spatial distance between microphone and loudspeaker, optimized for the quality of the sound transmission, is also effected in addition to comfortable handling.

According to an additional development of the present invention, the folding mechanism for the two sub-sections of the housing can be mechanically locked in the folded condition. An unintentional opening of the device, when used only in the telephone mode or during transport, is thereby prevented and the keyboard and display are protected against mechanical damage. In a preferred embodiment of the communication device, the housing is fashioned such that the two housing parts form a continuous surface with one another in the folded-open condition, whereby it can be expedient for operating ease that the keyboard and the display are in a common plane.

According to a further development of the present invention, the device is provided with a menu pin with which the touch-sensitive display or the alphanumerical keyboard can be operated. A receptacle for this pin is also provided in a sub-region of the device housing that also contains the telephone. The operating ease of the display as an input means is enhanced, and the reading, recognition and interpretation of information written by hand on the display with the pin becomes possible with suitable software.

In order to enable simple connection of the communication device to external devices such as headphone, printer or personal computer, a multi-plug jack can be provided on the device. It is thereby expedient for reasons of space that the multi-plug jack is accommodated in the shaft provided for the acceptance of the menu pin.

According to a development of the present invention, the communication device can be supplemented by a mini-camera that can be plugged into the device and can thereby be turned around on a swivelling axis. This mini-camera, in collaboration with the telephone or, respectively, the notebook enables mobile video conference or, respectively, the filming and scanning of subjects.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 6 is a side view of the telephone part separated from the unfolded housing;

FIG. 7 is a side view of the unfolded communication device in video conference mode;

FIG. 8 is a plan view onto the telephone part separated from the device;

FIG. 9 is a plan view onto the communication device in its unfolded condition with the telephone part separated therefrom.

DESCRIPTION OF THE PREFERRED EMBODIMENT

Figure 1:
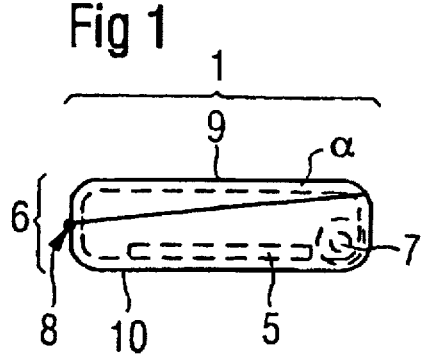
FIG. 1 is a cross-section through the communication device in its closed condition perpendicular to the swivelling axis of the housing.

The mobile communication device 1 shown in various positions of use in the FIGS. 1–10 is essentially composed of two sub-sections 9 and 10 connected to one another by a swivelling axis, of a touch-sensitive display 3 and of a movable telephone part 2 that, dependent on the position of use, can be separated or withdrawn from the device housing 6 together with the display 3. Whereas an alphanumerical keyboard for the notebook is accommodated in the sub-section 9 of the housing 6, the electronic assemblies of the device, the display as well as two receptacle shafts 5, 7 for the movable telephone part 2 a menu pin 4 provided for using the display 3 employed as a touch screen, respectively, are located in the sub-section 10. As an additional outfitting, a minicamera 26, rotatable around an axis 27, can be laterally attached to the device 1.

Figure 2:
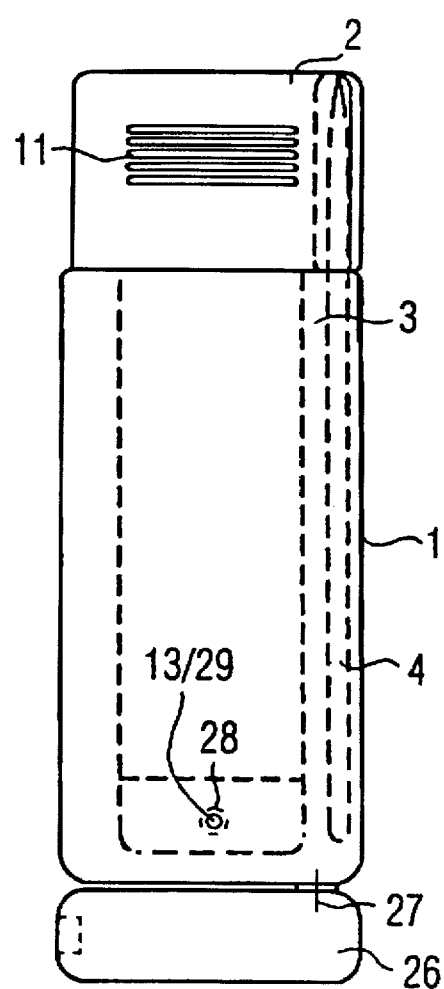
FIG. 2 is a plan view onto the communication device in its closed condition with retracted display and telephone part.

FIG. 2 shows the inventive communication device 1 in the folded condition that is expedient for transport. The display 3 and the majority part of the withdrawable telephone part 2 are thereby located in the interior of the device housing 6 and protected against external mechanical forces. The display 3 and the telephone part 2 are thereby mechanically connected to one another in order to make it possible to withdraw both parts from the housing 6 in common and to prevent the movable telephone part 2 from unintentionally falling out. Receiving and conducting telephone calls is already possible in this use position. A sound passage opening 13 is located in the sub-section 9 of the device in order to assure sound transmission from the telephone user to the transmitter 28 located in the movable telephone part 2. Alternatively, however, an additional transducer 29 that assumes the function of the transmitter 28 in this use position and that can be activated externally to the device 1 can be provided instead. The head part of the extensible telephone part 2 has further sound passage openings 11 to the internally accommodated receiver. During transport or exclusive telephone mode, the menu pin 4 is located in the receptacle shaft 7 of the device part 10. As additional outfitting, a minicamera 26 can be attached via a swivelling axis 27 to that end of the communication device lying opposite the head part of the telephone part 2.

Figure 3:
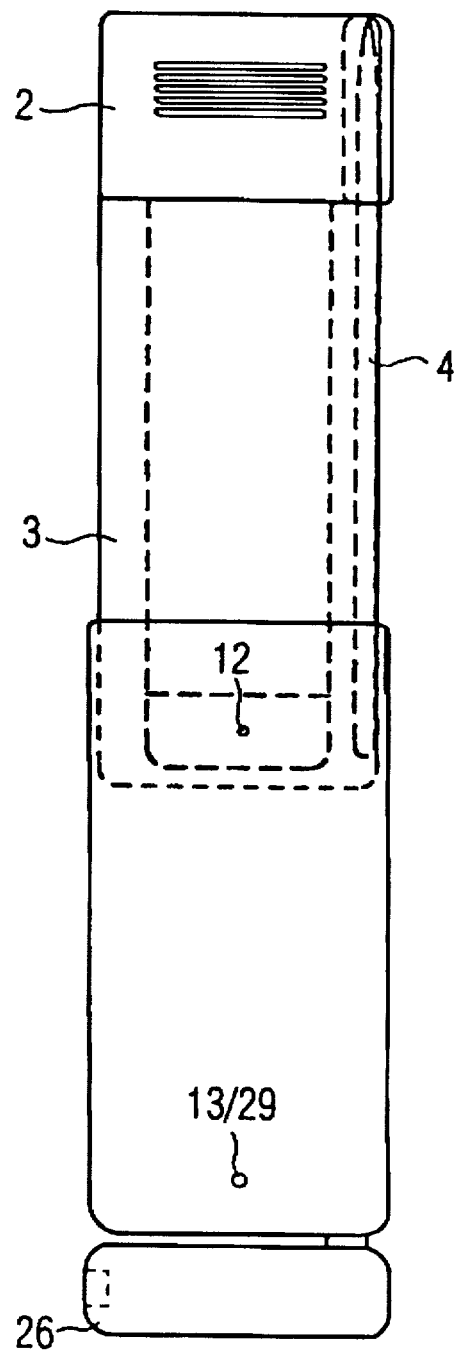
FIG. 3 is a plan view onto the communication device in the closed condition with display and telephone part withdrawn therefrom.

The inventive communication device is likewise shown in its folded condition in FIG. 3, but with extended display 3 and telephone part 2. This use position is distinguished by easy handling of the device 1 and, in addition to enabling telephone calls to be received and conducted, also enables telephone call to be placed, whereby the touch-sensitive display 3 is operated as a telephone keyboard. The sound conduction to the transmitter 28 is assured by a further sound passage opening 12 behind which the transducer 28 that comes to lie in the extended condition of the telephone part 2. The sound passage opening 12 is also eliminated in the aforementioned, alternative version with auxiliary microphone 29 instead of the opening 13. Due to the increased distance between listening and speaking sides, undesirable interactions between the two sides are also minimized and the quality of the sound transmission is thus enhanced.

Figure 4:
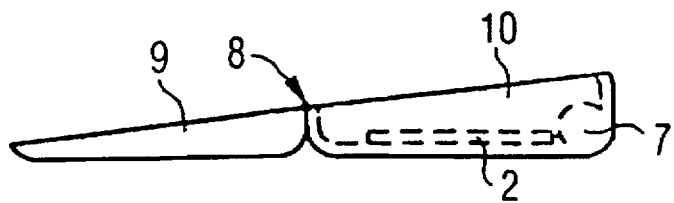
FIG. 4 is a side view of the unfolded communication device in the direction of the housing axis.

FIG. 4 shows the unfolded communication device in cross-section in a direction of view along the swivelling axis 8. The parting surface between the two sub-sections 9 and 10 of the device proceeds at an acute angle α to the outside surface of the device part 9 when the device is folded up (see the housing cross-section in FIG. 1). As a result thereof, a planar and continuous operating surface formed by the keyboard 14 and the display 3 results in the unfolded condition of the device 1.

Figure 5:
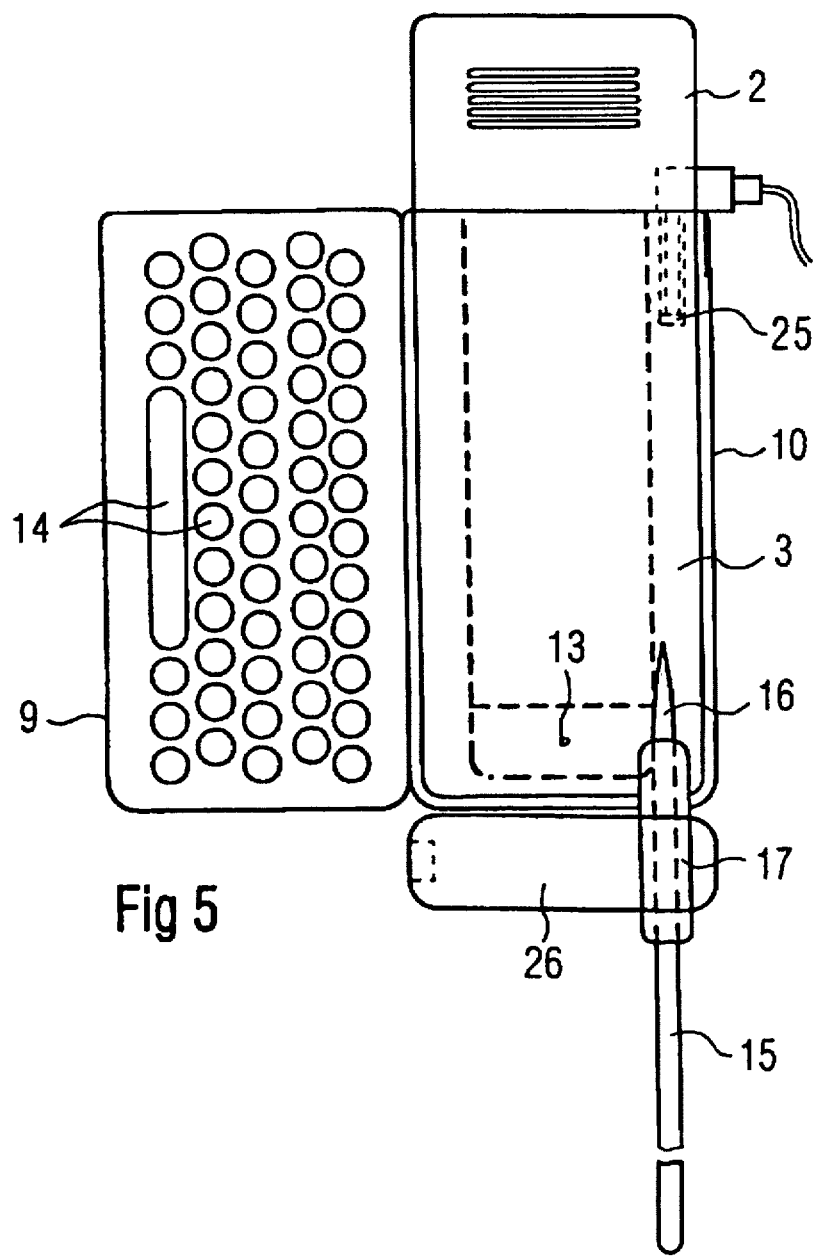
FIG. 5 is a plan view onto the communication device in its unfolded condition.

FIG. 5 shows a plan view onto the unfolded communication device when operated only in notebook mode, whereby display 3 and telephone part 2 are not pulled out. The multi-plug jack 25 with a mating socket accommodated in the receptacle shaft 7 for the menu pin 4 is also depicted in the drawing. External devices such as, for example, personal computers, printers, desktop scanners or diskette drives, etc., for data transmission in both directions or a headphone can be connected via this jack 25. In notebook mode, the menu pin 4 is taken from its receptacle 7 in order to comfortably operate the alphanumerical keyboard or, in order to activate switch fields in menu strips on the display 3 operated as a touch screen or to be able to make handwritten entries. The pin 4 itself is composed of a rod-shaped main part 15 with an end 16 tapering to a point and of a sleeve-like handle 17. In order to make use of as little storage space 7 as possible in the device housing 6, the main part 15 of the pin 4 expediently has a maximum diameter that is less than, for instance, a commercially standard lead pencil. Comfortable manipulation, however, is achieved by the handle 17 serving as gripping region that is fashioned with an appropriate diameter and can be positioned as needed on the main part 15 of the pin 4. When the menu pin 4 is plugged into the shaft during transport or telephone mode, then the handle 17 has room in the approximately hemispherical recess 18 in the head of the telephone part 2 (see FIG. 6)

FIG. 7 shows the operation of the inventive communication device 1 in a video conference in a side view onto the unfolded device 1. The minicamera 26, rotatable around the axis 27, swivelled in the direction of the user and supplies an image (at least a still image) in each video conference that is transmitted via the telephone in addition to the telephone call. An incoming video image can thereby be displayed on the display 3.

FIGS. 8 and 9 show a plan view onto the inventive communication device 1 separated into the telephone part 2 and the remaining principal part of the device. Simultaneous operation of telephone and notebook is possible in this condition, whereby the display 3 is available for both functions selectively or simultaneously.

The power supply of the device 1 ensues with a rechargeable battery cell accommodated in the housing 6 that can be charged via the contact points 21 and 22. A further chargeable battery that supplies the movable telephone part 2 and that is accommodated therein is supplied, proceeding from the main cell, via the contact elements 21,22 and corresponding cooperating contacts 23 and 24. The telephone part 2 is thereby prevented from unintentionally sliding out of its receptacle 5 by a catch element 19 that engages into the depression 20 (see FIG. 6 and FIG. 9).

Figure 10:
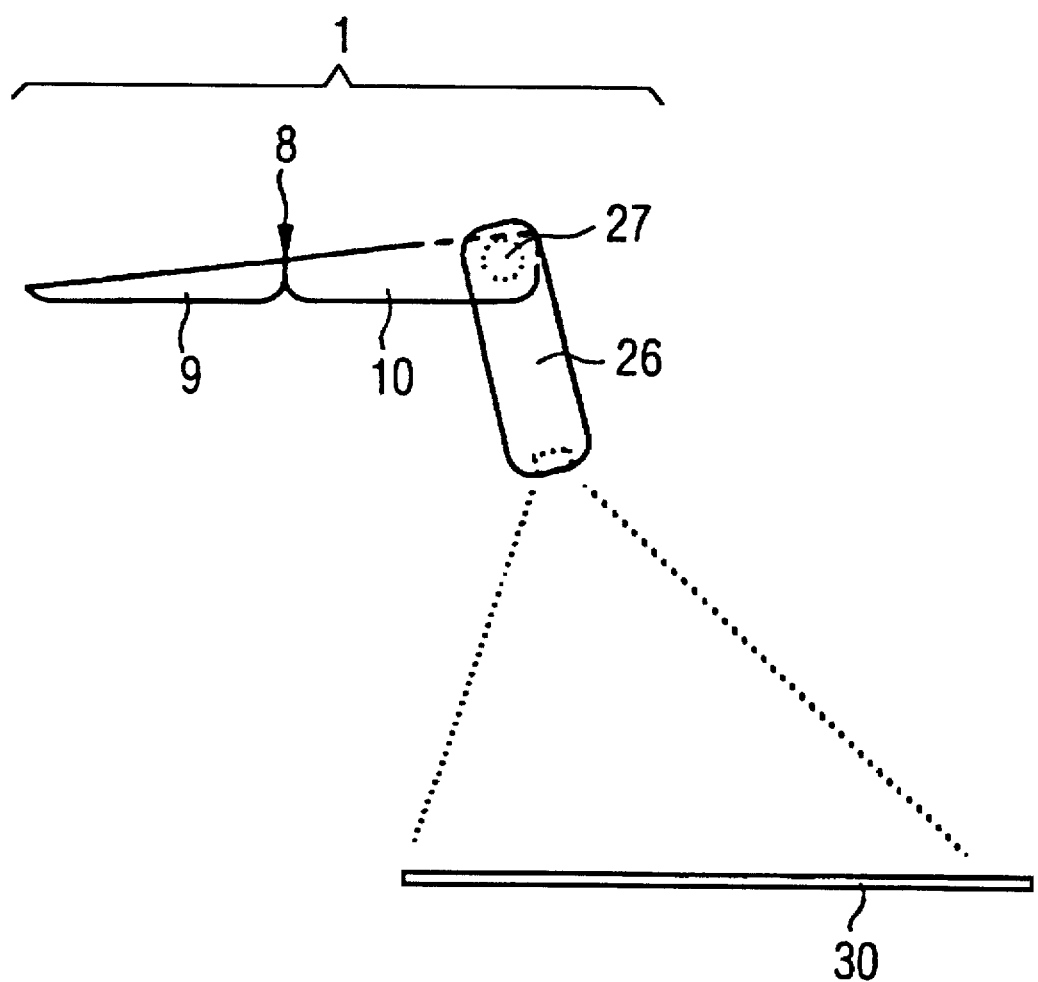
FIG. 10 depicts the communication device in use as a mobile scanner.

FIG. 10 shows the inventive communication device 1 in use as a mobile scanner, whereby the minicamera 26, rotatable around the axis 27, is directed from an appropriate distance onto a subject 30 to be viewed or, respectively, scanned in.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication device for mobile operation, the communication device having a telephone and notebook with a display, comprising:

a device housing having a pocket format and having first and second sub-sections connected to one another by a swivelling axis so that the device housing is openable, the first sub-section having a receptacle for the telephone, and the display and the second sub-section having a keyboard accessible to a user;

the display being a touch-sensitive display device via which inputs for at least one of the notebook and the telephone can ensue dependent on the operating mode of the communication device;

the telephone having a handset that is removable relative to the first sub-section, the handset being wirelessly separated from the communication device when the communication device is in its unfolded condition, whereby simultaneous operation of telephone and notebook is possible; and for use of the communication device only as the telephone, the movable handset of the telephone being mechanically connected to the display in the folded condition of the communication device and, together therewith, being extendable in relation to the receptacle, whereby the touch-sensitive display device is operated as a telephone keyboard.

2. The communication device according to claim 1, wherein the telephone is a mobile telephone integrated in the communication device, and wherein the removable handset of the telephone is a cordlessly operable handset with respect to the communication device.

3. The communication device according to claim 1, wherein the removable handset of the telephone is a complete mobile telephone, except for an input device.

4. The communication device according to claim 1, wherein the telephone is a cordless telephone with an external base station that does not belong to the communication device itself.

5. The communication device according to claim 1, wherein the notebook has a modem for transmission of data via the telephone.

6. The communication device according to claim 1, wherein the removable handset has a transmitter, and wherein sound passages that assure guidance of sound to the transmitter accommodated in the removable handset telephone both in an inserted, as well as, in a removed condition of the removable handset with the communication device folded up are respectively provided in the second sub-section.

7. The communication device according to claim 1, wherein the removable handset has a transmitter and wherein a transducer that functions as a microphone instead of the transmitter in the removable handset in the folded position of use of the communication device is provided in the second sub-section.

8. The communication device according to claim 1, wherein the communication device has a folding mechanism for the first and second sub-sections of the housing, the folding mechanism being mechanically lockable in the folded condition.

9. The communication device according to claim 1, wherein the first and second sub-sections form a continuous, planar operating surface with one another in the folded-open condition.

10. The communication device according to claim 1, wherein the communication device is provided with a menu pin with which the touch-sensitive display device is operated, and wherein the first sub-section has a receptacle shaft for the menu pin.

11. The communication device according to claim 1, wherein the communication device has a multi-plug jack for connection to external devices.

12. The communication device according to claim 1, wherein the communication device is provided with a menu pin with which the touch-sensitive display device is operated, wherein the first sub-section has a receptacle shaft for the menu pin, and wherein the communication device has a multi-plug jack for connection to external devices.

13. A communication device for mobile operation, the communication device having a telephone and notebook with a display, comprising:

a device housing having a pocket format and having first and second sub-sections connected to one another by a swivelling axis so that the device housing is openable, the first sub-section having a receptacle for the telephone, and the display and the second sub-section having a keyboard accessible to a user;

the display being a touch-sensitive display device via which inputs for at least one of the notebook and the telephone can ensue dependent on the operating mode of the communication device;

the telephone having a handset that is removable relative to the first sub-section, the handset being wirelessly separated from the communication device when the communication device is in its unfolded condition, whereby simultaneous operation of telephone and notebook is possible;

for use of the communication device only as the telephone, the movable handset of the telephone being mechanically connected to the display in the folded condition of the communication device and, together therewith, being extendable in relation to the receptacle, whereby the touch-sensitive display device is operated as a telephone keyboard;

a menu pin with which the touch-sensitive display device is operated, the first sub-section having a receptacle shaft for the menu pin, and the communication device having a multi-plug jack for connection to external devices;

the multi-plug jack being accommodated in the shaft provided for acceptance of the menu pin.

14. The communication device according to claim 1, wherein the communication device further comprises:

a camera that is swivellable around a swivelling axis attached to the device housing, the camera, in collaboration with the telephone or, respectively, the notebook enabling mobile video conferences or, respectively, viewing and scanning of subjects.

15. A communication device for mobile operation, comprising: a telephone;

a notebook with a display;

a device housing having a pocket format and having first and second sub-sections connected to one another by a swivelling axis, the first sub-section having a receptacle for the telephone and the display, and the second sub-section having a keyboard accessible to a user;

the display being a touch-sensitive display device via which inputs for at least one of the notebook and the telephone can ensue;

the telephone having a handset that is removable from the first sub-section, the handset being wirelessly separated from the communication device when the communication device is in an unfolded configuration, whereby simultaneous operation of telephone and notebook is possible; and the handset of the telephone being mechanically connected to the display in a folded configuration of the communication device, whereby the touch-sensitive display device is operated as a telephone keyboard.

16. The communication device according to claim 15, wherein the notebook has a modem for transmission of data via the telephone.

17. The communication device according to claim 15, wherein the removable handset has a transmitter and wherein sound passages that assure guidance of sound to the transmitter accommodated in the removable handset telephone both in an inserted, as well as, in a removed condition of the removable handset with the communication device folded up are respectively provided in the second sub-section.

18. The communication device according to claim 15, wherein the communication device further comprises:

a camera that is swivalable around a swivelling axis attached to the device housing, the camera, in collaboration with the telephone or, respectively, the notebook enabling mobile video conferences or, respectively, viewing and scanning of subjects.

19. A communication device for mobile operation, comprising:

a telephone;

a notebook with a display;

a device housing having a pocket format and having first and second sub-sections connected to one another by a swivelling axis, the first sub-section having a receptacle for the telephone and the display, and the second sub-section having a keyboard accessible to a user;

the display being a touch-sensitive display device via which inputs for at least one of the notebook and the telephone can ensue;

the telephone having a handset that is removable from the first sub-section, the handset being wirelessly separated from the communication device when the communication device is in an unfolded configuration, whereby simultaneous operation of telephone and notebook is possible;

the handset of the telephone being mechanically connected to the display in a folded configuration of the communication device, whereby the touch-sensitive display device is operated as a telephone keyboard;

a menu pin with which the touch-sensitive display device is operated, the first sub-section having a receptacle shaft for the menu pin; and a multi-plug jack for connection to external devices.

20. The communication device according to claim 19, wherein the multi-plug jack is accommodated in the shaft provided for acceptance of the menu pin.

* * * * *